Aug. 28, 1923.

H. P. KRAFT

SHEET METAL NUT

Original Filed March 21, 1919

1,466,176

WITNESS:
Rene Burine

INVENTOR:
Henry P. Kraft,
By Attorneys,

Patented Aug. 28, 1923.

1,466,176

UNITED STATES PATENT OFFICE.

HENRY P. KRAFT, OF RIDGEWOOD, NEW JERSEY.

SHEET-METAL NUT.

Original application filed March 21, 1919, Serial No. 284,011. Divided and this application filed May 2, 1919. Serial No. 294,266.

*To all whom it may concern:*

Be it known that I, HENRY P. KRAFT, a citizen of the United States of America, residing in Ridgewood, in the county of Bergen and State of New Jersey, have invented certain new and useful Improvements in Sheet-Metal Nuts, of which the following is a specification.

This application is a division of my application No. 284,011, filed March 21, 1919.

This invention relates to sheet metal nuts and aims to provide certain improvements therein.

The invention is particularly directed to a sheet metal nut which is especially adapted to be used as a rim nut for tire valves and which has an inner screw-thread to engage the tire valve casing and an outer screw-thread of larger diameter adapted to engage a dust cap or the like.

The invention comprises generally two sheet metal structures, one of which has an extension within which such inner screw-thread is formed, and the other of which has a similar extension upon which said outer screw-thread is formed. The structures are best made hexagonal in form and one is adapted to fit within the other so that a non-rotative connection is secured. The invention includes other features of construction which will be hereinafter more fully described.

Referring to the drawings which illustrate one form of the invention,—

Figure 1:
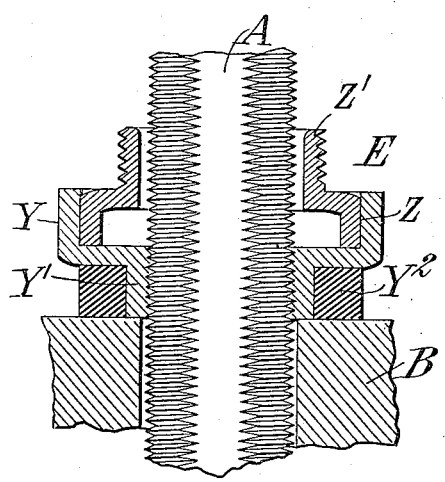
Figure 1 is a fragmentary view of a tire valve casing showing the improved nut applied thereto, the nut being illustrated in diametrical section.
Figure 2:
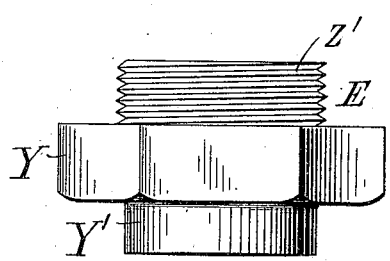
Fig. 2 is an elevation of the nut of Fig. 1.
Figure 4:
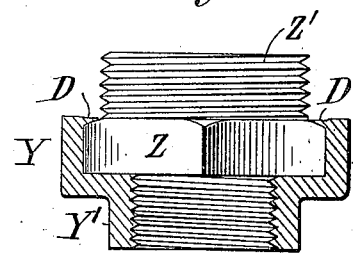
Fig. 4 is a diametrical section taken on the line 4—4 in Fig. 3.
Figure 3:
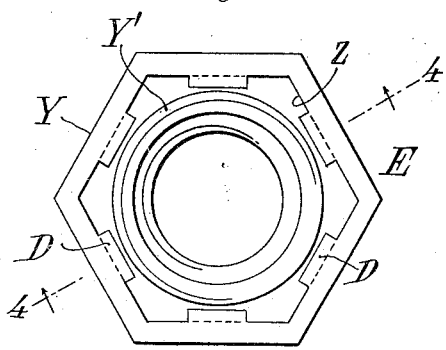
Fig. 3 is a plan view of the nut.

Referring to the drawings, let A indicate a tire valve casing which is provided with the usual screw-threaded exterior. E indicates the nut as a whole, which is shown as screwing on the tire valve casing and bearing against the usual felloe or rim B.

In the preferred construction of nut, two sheet metal blanks are used, one being formed with the exterior flat faces Y and the cylindrical extension Y'. The other is formed to fit within the first and has flat faces Z and a screw-threaded extension Z'. The two blanks are placed one within the other, face to face, and secured together by upsetting the edge of the outer one slightly over the inner one, as shown at D, or in any other suitable way. The cylindrical extension Y' is preferably utilized for the inner thread which engages with the valve casing and also serves as a washer seat for the washer $Y^2$. The screw-threaded extension $Z^1$ serves as a means of attachment for the usual dust cap (not shown). This gives a point of connection for the dust cap, which latter may be of greater internal diameter than the exterior diameter of the valve casing. This permits the use of a valve cap on the valve casing which is of greater external diameter than the diameter of the casing itself. This construction facilitates the use of a valve having no reduced nipple at its end; in such constructions, the valve cap, if it fits exteriorly of the valve, must of necessity be of larger diameter than the valve casing and hence prevents the use of a dust cap which screws directly upon the casing.

The construction also provides a very strong and durable nut adapted to amply withstand service strains on valves of larger diameters, such as are adapted for heavy truck tires.

While I have shown and described one form of the invention it will be understood that I do not wish to be limited thereto, since various changes may be made therein without departing from the spirit of the invention.

What I claim is:—

1. A sheet metal nut comprising two parts, each having a body portion with an exterior flange and a tubular extension, the two body portions fitting the one within the other in non-rotative engagement, and the tubular extensions projecting in opposite directions.

2. A sheet metal nut comprising two parts, each having a body portion with an exterior flange and a tubular extension, the two body portions fitting the one within the other in non-rotative engagement, and the tubular extensions projecting in opposite directions, and one of them screw-threaded.

3. A sheet metal nut comprising two parts, each having a body portion with an exterior flange and a tubular extension, the two body portions fitting the one within the other in non-rotative engagement, and the tubular extensions projecting in opposite directions, said extensions screw-threaded, the one interiorly and the other exteriorly.

4. A sheet metal nut comprising two parts, each having a body portion with an exterior flange and a tubular extension, the flange and extension projecting in opposite directions, the two body portions fitting the one within the other in non-rotative engagement, and at least one of the tubular extensions screw-threaded.

5. A sheet metal nut comprising two polygonally-interfitting parts, each having a body portion with an exterior flange and a tubular extension, the two body portions fitting the one within the other, and the tubular extensions projecting in opposite directions.

6. A nut according to claim 5, the body portions of the two parts permanently united.

In witness whereof, I have hereunto signed my name.

HENRY P. KRAFT.